No. 608,323. Patented Aug. 2, 1898.
A. D. CYPHER.
CONDENSED MILK CUP.
(Application filed Oct. 18, 1895.)
(No Model.)
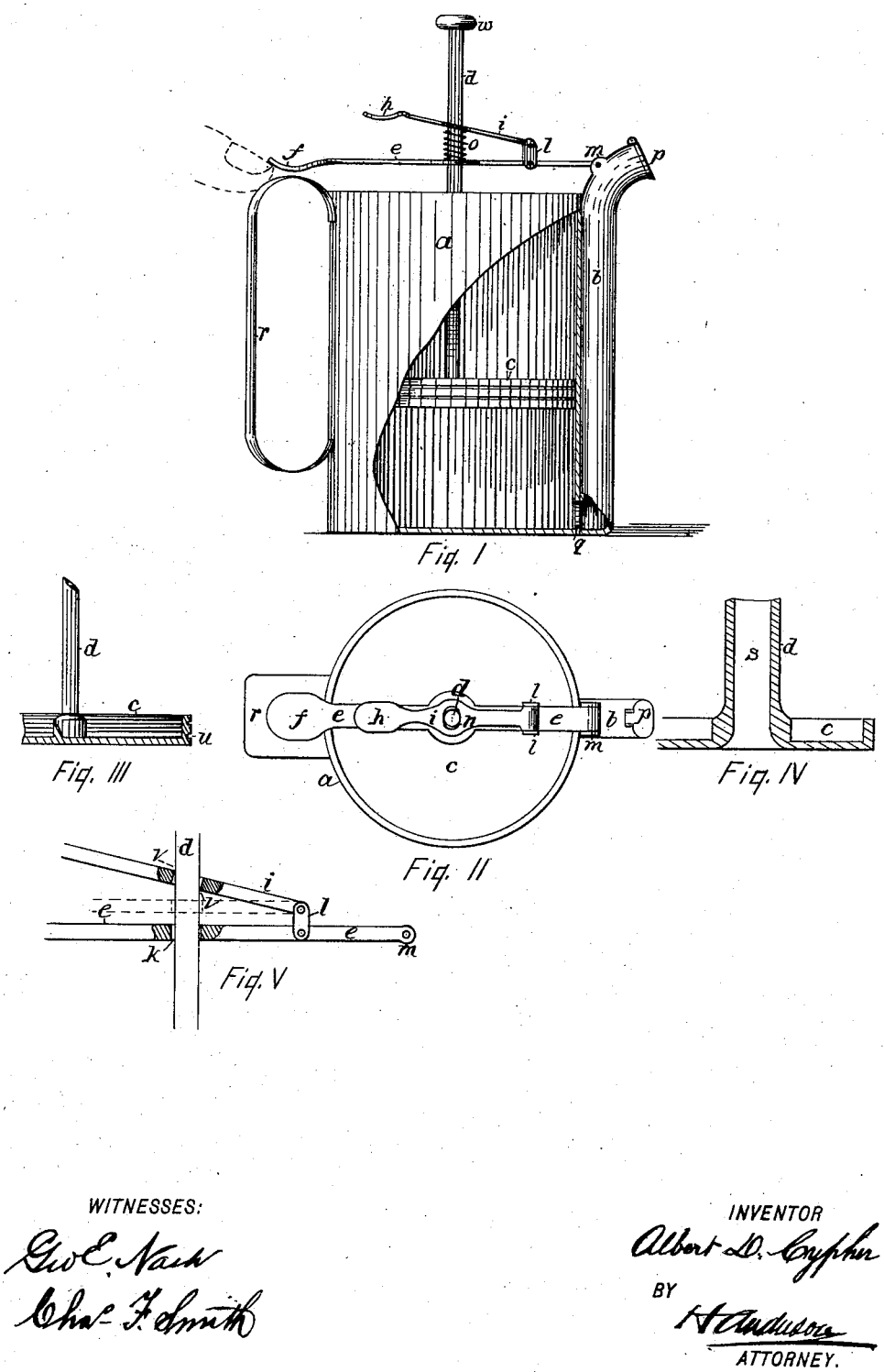

UNITED STATES PATENT OFFICE.

ALBERT D. CYPHER, OF NEW YORK, N. Y., ASSIGNOR OF ONE-HALF TO S. LOTHROP FOWLER, OF PEEKSKILL, NEW YORK.

CONDENSED-MILK CUP.

SPECIFICATION forming part of Letters Patent No. 608,323, dated August 2, 1898.

Application filed October 18, 1895. Serial No. 566,066. (No model.)

*To all whom it may concern:*

Be it known that I, ALBERT D. CYPHER, a citizen of the United States, and a resident of New York, (Brooklyn,) in the county of Kings and State of New York, have invented a certain new and useful Condensed-Milk Cup, of which the following is a specification.

My invention relates particularly to receptacles for the convenient use of condensed milk, although the device may be employed for syrups, oils, and like fluids. Its object is to provide a vessel for containing the article and from which it may be taken in any required quantity without exposing what remains in the vessel to the action of the atmosphere and the invasion of insects. The objects are attained by the means set forth in the annexed drawings, which, together with this specification, I declare to be a full, clear, and exact description of my invention, such as will enable others skilled in the art to which it appertains to make and use the same.

Figure I represents the cup nearly full size and partly in section, revealing the entire construction. Fig. II is a top view of the same. Fig. III shows how the piston may be simply made. Fig. IV is another form of piston having a central outlet. Fig. V illustrates the method of operating the piston.

Referring to Fig. I, the cup $a$ is plainly cylindrical inside, although the outer surface may be as ornamental as the maker pleases. The inside is true and smooth, so that the least possible resistance is offered to the upward and downward movement of the piston $c$. A spout $b$ is attached to one side, as shown, having a communication with the interior of the cup through the aperture $q$. This spout of course may be of any desirable shape, a form being exhibited here that gives a compact and neat form of construction. The outlet of the spout is shown provided with a hinged cover $p$. This cover may or may not be employed, as one chooses. The handle $r$ of the cup is also of a form to insure neatness and compactness and may be made to suit the fancy.

The piston $c$, as shown in Fig. III, is a plain lightly-constructed disk having a central hub $d$ for the piston, the outer flanged surface having grooves $u$ to secure a pneumatic packing. The piston may, however, be made plain, as in Fig. IV. The piston may be given a water-tight fit and will still easily move up and down in the cup.

A lever $e$ is thrown across the top of the cup and is pivoted to the spout at $m$ by means of lugs fastened to the spout, as shown. The fastening is to the spout only because this form of spout offers a convenient means for the purpose. The fastening might be to the rim of the cup and answer equally well.

The piston-rod $d$, which is fast to the piston, passes through the lever $e$, the hole in the lever not fitting the piston rod or stem closely. The end of the lever toward the cup's handle is shaped for manipulation by the finger, as shown at $f$. To this lever $e$ a shorter lever $i$ is hinged by means of links $l$. The other end of the lever $i$ is also made somewhat spoon-shaped for ease of manipulation. The hole in the lever $i$ through which the stem $d$ passes also fits loosely about the stem.

A spring $o$ between the two levers $i$ and $e$ tends to keep them apart. By reference to Fig. V it will be seen that depressing lever $e$ by pressure on the end $f$ will cause the lever $i$ to pinch the stem $d$ at the points $v$ $v$ in such a manner that the stem (and piston) will be carried downward with the levers. To raise the piston, the lever $i$ is depressed by pressure on the lever $h$ $i$, as per the broken lines in Fig. V. When in this position, the piston-rod is free from both levers and may be raised or lowered at will or may be removed from the cup.

The cup is used in the following manner: Lever $i$ is depressed so that the piston may be withdrawn from the cup. By unscrewing the knob $w$ the piston may be entirely removed for cleansing. A can of condensed milk is entirely emptied into the cup, the cup being made to allow ample room above this quantity of milk to receive the piston. The piston is put in place, and the levers are depressed until the end $f$ of lever $e$ reaches the downward limit of movement, in the illustration the top of the handle $r$ constituting such limit. The handle being grasped by the fingers of the hand, the thumb will be free to manipulate the lever $e$, it not being necessary to touch the shorter lever. A slight pressure under the lever with the end of the thumb, as indicated in Fig. I, will lift the lever, and the spring $o$ will cause the lever $i$ to rise with it. The thumb now being placed on the lever and pressed downward will cause the short lever to pinch the stem, and the piston will go down with the movement of the lever. Pressure on the piston presses the milk out from the spout of the cup. The quantity expelled will be large or small in proportion to the lift and downward movement of the levers and may be regulated to a nicety by the manipulation of the lever $e$.

It is found in use that when in expelling milk from this cup the lever is pushed to its lowest limits and the milk ceases to issue from the spout and the cup is placed on a table there is left a modicum of tension on the spring $o$, which, with the column of milk in the spout, causes the piston to rise slightly, drawing the contents of the spout largely into the cup and well away from the outlet of the spout, overcoming all tendency to drip at the spout.

The valve-covering $p$ on the spout may be omitted and is of value chiefly to keep insects from entering the spout, and in warm climates will prevent the drying out of the contents of the spout, which might under some conditions affect the easy discharge of the contents of the cup.

The spout itself may be omitted for some purposes, in which case the piston-stem $d$ would be made of a size to admit of its being used as a spout, as shown in Fig. IV, the stem $d$ having an opening $s$ through it as large as a spout-opening.

Plainly there are other uses for which this device may be employed besides as a milk-cup. As a grease-cup, an engine-oil cup, for holding printers' ink, a syrup-cup, in fact for any liquids of thick body, it is admirably adapted, because it affords a safe containing vessel from which the contents may be taken in small quantities without waste. So I do not wish to be limited to its use as a milk-cup, although for convenience I have shown and described it as such. Neither do I wish to be limited to any particular material of which it may be made, nor to the particular form herein shown and described, so long as I embody the principles of the invention in its construction.

Having described my invention, what I claim, and desire to secure by Letters Patent of the United States, is—

1. A cup with spout and handle, a piston to traverse the interior of the cup, a piston-stem levers hinged together and to the cup, and an intervening spring whereby end of the levers is caused to grip the piston-stem for forcing the piston downward, combined to operate substantially as shown and described.

2. In combination with a cup having a smooth interior, a piston $c$ having a stem $d$, lever $e$ pivoted to one side of the cup, lever $i$ hinged to lever $e$, and spring $o$, the said piston-stem passing through said levers and spring, all operating together substantially as shown and described.

3. In combination with a cup provided with a piston having a stem projecting therefrom, lever $e$ pivoted to the side of the cup, lever $i$ hinged to lever $e$, and spring $o$, substantially as and for the purpose described.

4. The combination substantially as shown, of the cup $a$ provided with a spout and handle, piston $c$, piston-stem $d$ with knob $w$, lever $e$ pivoted to the spout $b$ and reaching across the cup to the handle $r$, links $l$, lever $i$, and spring $o$.

Signed at city of Brooklyn, in the county of Kings and State of New York, this 3d day of October, A. D. 1895.

ALBERT D. CYPHER.

Witnesses:
GEO. E. NASH,
CHAS. F. SMITH.